June 10, 1969   R. W. ASTHEIMER   3,449,121
INFRARED THERMOMETER
Filed Jan. 13, 1967
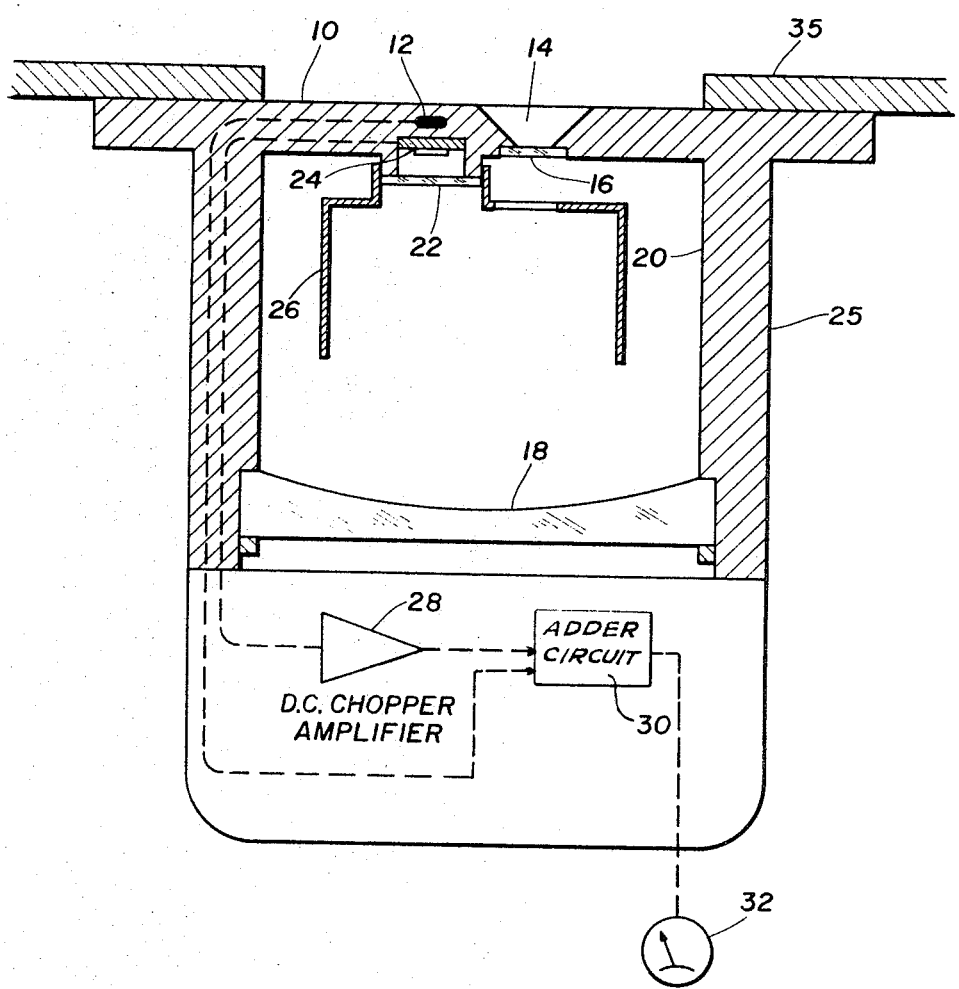
INVENTOR.
ROBERT W. ASTHEIMER
BY Joseph Levinson

United States Patent Office 3,449,121
Patented June 10, 1969

3,449,121
INFRARED THERMOMETER
Robert W. Astheimer, Westport, Conn., assignor to Barnes Engineering Company, Stamford, Conn., a corporation of Delaware
Filed Jan. 13, 1967, Ser. No. 609,030
Int. Cl. G01k 13/00
U.S. Cl. 73—355     3 Claims

ABSTRACT OF THE DISCLOSURE

A radiation pyrometer having a thermistor bead temperature sensor imbedded in a heat sink which is exposed to the ambient temperature, and a thermopile radiation detector and a window mounted close together on the heat sink, with the thermopile being imaged on the window by a mirror. Signals from the sensor and detector are combined to provide a temperature measurement.

Background of the invention

This invention relates to an infrared thermometer in which the temperature of the substance to be measured is approximated by the use of a simple resistance thermometer element which is corrected using a radiometric signal.

The present invention concerns the solution of temperature measuring problems discussed in Patent No. 3,272,013 issued Sept. 13, 1966 to the applicant. In the aforesaid patent a radiometer is provided in which its elements are housed in a thermostatically controlled reference cavity whose temperature must be controlled to a very high degree of accuracy at a higher level than any temperature which is expected to be measured. If the temperature of the material to be measured varies markedly from that of the reference cavity, a high degree of accuracy is required both on the temperature control of the cavity and the electronics which process the signal. For example, for measuring the temperature of air, in which the cavity will normally be controlled at 50° C., to obtain an accuracy of 1° C. at an air temperature of −70° C., the temperature of the cavity must be held to within 0.1° C. Again, in the case of measuring air temperature, which is usually much lower than the reference temperature, and varies widely with altitude, large radiation signals result from the radiometer, and the gain and the phase of the electronics must be held very stable. For example, a gain of 0.5% will produce a change in signal equivalent to 1° C. error at −70° C. This results in providing a sophisticated and expensive instrument. The present invention approaches the problem in a different manner, to eliminate the critical requirements of a thermostatically controlled reference cavity and the electronic processing of large radiometric signals.

Summary of the invention

In carrying out this invention in one illustrative embodiment thereof, a heat sink is exposed to the ambient temperature of the material whose temperature is to be measured, and a resistance thermometer is embedded in the heat sink for measuring that temperature. A window which is exposed to the radiation of the material whose temperature is to be measured and an infrared detector are mounted on the heat sink. A mirror images the infrared detector onto the window, whereby radiation from the material is applied to the infrared detector. Signals from the resistance thermometer element and the infrared detector are combined to provide a signal indicative of the temperature of the material whose temperature is to be measured.

Brief description of the drawing

The drawing is a schematic diagram of an illustrative embodiment of this invention.

Description of the preferred embodiment

Although not necessarily restricted to any specific operating conditions, the present invention is believed to be most applicable to those situations where the ambient temperature of the thermometer itself follows or more closely corresponds to the temperature of the material or substance actually being measured, as distinguished from those applications where there is a substantial difference in temperature between the instrument or its environment and the temperature which is desired to be measured. One such application would be the measurement of air temperatures from airplanes or other flying vehicles. Accordingly, the invention will be described in conjunction with the requirements of free air thermometers, although it should be understood that the invention is in no sense limited by such use, and it may be used for similar or any other purposes where the requirements for temperature measurement present similar or related problems.

Referring now to the drawing, the infrared thermometer 25 is mounted to the skin of an aircraft 35 having its base or heat sink 10 exposed to the ambient air. A resistance thermometer element, for example a thermistor bead 12, is embedded in the heat sink 10 for approximately measuring the free air temperature. An opening 14 in the heat sink 10 is provided with a window 16 which receives radiation from its field of view. An infrared detector 24 is mounted on the under side of the heat sink 10 in close proximity to the window 16 and the resistance thermometer element 12. Although any suitable infrared detector may be utilized, a thermopile detector is preferred in the present embodiment, since it is well suited for the present mode of operation. The output of the thermopile detector is proportional to the difference between the temperature of its reference junctions and that of its radiometric field of view. Furthermore, its responsivity is almost completely independent of ambient temperature. The reference junctions of the thermopile 24 are intimately associated with the heat sink 10 in good heat-conducting relationship, with the active junctions being insulated therefrom. The solid-backed thermopile of the type manufactured by Barnes Engineering Company of Stamford, Conn., is suitable for this purpose.

A mirror 18 housed in a cavity 20 of the infrared thermometer 25 images the thermopile detector 24 onto the window 16 in order to keep the window as small as possible and to insure that the temperature of the window will be close to that of the heat sink 10. For the specific application of the measurement of air temperatures, a filter 22 is mounted over the thermopile detector 24 to pass radiation in the carbon dioxide band, due to the suitable radiation characteristics of that band with respect to the measurement of air temperature. For the measurement of temperatures of other materials, it may be desirable to use filters which pass different bands, depending upon the radiation characteristics of the material whose temperature is being measured. By mounting the filter 22 over the detector 24, most of the emission from the window per se will be blocked by the filter 22. The window 16 should be suitable for passing the radiation which is desired to be measured, and for the specific application in the measurement of air temperature, a thin silicon or IRTRAN-4 window would be suitable. A radiation shield 26 is thermally coupled to the heat sink 10 to eliminate any spurious signals from thermal gradients in the walls of the cavity 20. The necessity for such a shield 26 will depend upon whether the thermal gradients of the walls of the cavity 20 provide a problem. The cavity 20 is evacuated to prevent condensation and to increase the responsivity of the detector 24.

In operation the heat sink 10 will follow an as approximation the temperature of the ambient air which is in intimate contact therewith. The resistance thermometer element 12 and its associated power supply measures the temperature of the heat sink 10, which is approximately that of the air temperature. The radiometric signal, which is provided by the thermopile detector 24, measures the difference between the temperature of the radiometric field of view supplied by the window 16 and the temperature of the reference junctions which are the same as that of the heat sink 10. Thus the radiometric signal generated by the thermocouple 24 provides a correction signal which is a relatively small part of the total readout, and any errors provided thereby will be proportionately less critical than for the case where a small change occurs on an already large radiometric signal. The output from the thermopile detector 24 is applied to a D.C. chopper amplifier 28 which is added at 30 to the D.C. signal derived from the resistance thermometer element 12. The D.C. chopper amplifier 28 is utilized to avoid the drift problems associated with D.C. amplifiers. The combined output signal at 30 is applied to a temperature readout 32 which may be in the form of a meter, recorder, or other suitable temperature readout device.

The field of view of the thermometer 25 will depend on the design of the optics. Using a spherical mirror, a 60° field of view, which is fairly wide, is easily achievable. Since the temperature of air varies greatly with altitude, it may be desirable to restrict the field of view vertically to reduce the effect of the vertical gradient. This can be accomplished by using a rectangular shaped mirror which, of course, will reduce the radiation applied to the detector, and the minimum detectable temperature. However, by making the window a vertical slot and using a toroidal mirror imaged on the detector, which is imaged on the horizontal plane but imaged at infinity in the vertical plane, such loss could be regained.

For use in measuring temperature in a supersonic aircraft, skin heating would prohibit the use of a forward looking aspect. Therefore the radiometer would be mounted looking sideways with a small fairing to break off the boundary layer caused by skin heating.

By allowing the reference temperature, which is set by the heat sink 10, to track, or follow the temperature of the substance or material whose temperature is to be measured, and using a radiometric signal as a correction, the infrared radiometer does not require elaborate electronics which must be held very stable as would be the case, for example, in the aforesaid patent. Furthermore, smaller changes in temperature may be detected, because smaller radiometric signals are being utilized. Since elaborate controlled cavity structure is not required, a simpler, smaller, and less expensive instrument is provided.

I claim:
1. An infrared thermometer comprising:
 (a) a heat sink positioned on one end of an enclosed cavity, said heat sink being exposed to the ambient temperature of the material whose temperature is to be measured,
 (b) a resistance thermometer imbedded in said heat sink for measuring the temperature of said heat sink and thereby closely approximating the temperature of the material whose temperature is being measured,
 (c) a window positioned in said heat sink adjacent said resistance thermometer,
 (d) an infrared detector mounted on the under side of said heat sink adjacent said window and close to said resistance thermometer,
 (e) a mirror positioned in said cavity opposite said heat sink for imaging said infrared detector onto said window whereby radiation from the material whose temperature is to be measured is applied to said infrared detector,
 (f) a radiation shield positioned in said cavity and thermally coupled to said heat sink to prevent any spurious signals caused by thermal gradients in the walls of said cavity, and
 (g) means for combining the signals produced by said resistance thermometer and said infrared detector to thereby provide a signal indicative of the temperature of the material whose temperature is being measured.

2. The infrared thermometer set forth in claim 1 wherein a filter is mounted over said infrared detector to restrict radiation applied thereto to a specific band of radiation from the material whose temperature is being measured.

3. The infrared thermometer set forth in claim 2 wherein said filter passes radiation in the carbon dioxide band for the measurement of air temperature.

References Cited

UNITED STATES PATENTS

| | | | |
|---|---|---|---|
| Re. 23,615 | 1/1953 | Fastie | 136—214 |
| 1,158,967 | 11/1915 | Bellingham | 136—214 |
| 2,696,117 | 12/1954 | Harrison | 73—355 |
| 2,800,023 | 7/1957 | Obermaier | 73—355 |
| 2,811,856 | 11/1957 | Harrison | 73—355 |
| 3,161,775 | 12/1964 | Weiss | 73—355 XR |
| 3,170,329 | 2/1965 | Prediger et al. | 73—355 |

LOUIS R. PRINCE, *Primary Examiner.*

F. SHOON, *Assistant Examiner.*

U.S. Cl. X.R.

136—214